Patented May 11, 1937

2,079,649

UNITED STATES PATENT OFFICE 2,079,649

QUICKLY PREPARED RAW VEGETABLE SOUPS

Hugh E. Allen, Evanston, Ill., assignor of one-half to Albert G. McCaleb, Evanston, Ill.

No Drawing. Application January 11, 1935, Serial No. 1,308

4 Claims. (Cl. 99—124)

My invention relates to quickly prepared raw vegetable soups, i. e., the invention contemplates the provision of dry powders, having as their flavor characterizing constituents finely divided dehydrated raw vegetables, which are made ready for consumption merely by adding hot water, or preferably by adding cold water and then bringing the latter to a simmering temperature.

The dry powders which are the subject-matter of the present invention keep indefinitely, either in packaged form or in bulk, without becoming wormy or rancid,—due to the presence in such powders of two very essential ingredients, viz., mono-sodium glutamate and sodium nitrite.

The sodium nitrite which is present in my novel soup powders, has a not-to-be-expected, but very-much-to-be-desired, action upon the finely divided dehydrated raw vegetables and the protein which accompanies them. This action occurs at, but not before, the instant the said raw vegetables and protein, and the sodium nitrite, are simultaneously heated by or in hot water.

Until the heating takes place, the sodium nitrite has no appreciable chemical effect upon the finely divided dehydrated raw vegetables or the proteins. At the moment the added water approaches its simmering temperature, the finely divided raw vegetables and proteins are instantly thoroughly cured by the sodium nitrite and are thereby given a "freshly cured" flavor, which is both unique and pleasing. This phenomenon readily may be proven by comparing the taste of the dry powder with the liquid soup made therefrom.

The mono-sodium glutamate, in addition to its function as a preservative, lends a decided meat-like flavor to the prepared soups.

Because of the highly concentrated character of my novel soup powders, it is feasible for a restaurant or a lunch counter to keep in stock a large number of soup powders, ready for practically instant service as plain or creamed vegetable soups of all of the usual or desired varieties.

In manufacturing the novel soup powders of my invention, I chop, dehydrate and finely mill fresh vegetables such as spinach, carrots, mushrooms, onions, garlic, peas, beans, tomatoes, parsley and celery.

The vegetables of the selected varieties, after being initially chopped, are dehydrated by the application of the least degree of heat sufficient to drive off their natural moisture,—so that the said vegetables will remain uncooked, keep their characteristic raw flavors and colors, and retain possession of their natural vitamins and mineral salts. The dehydrated raw vegetables are then preferably milled to the greatest degree of fineness which can be attained with modern grinding mills.

Having first prepared my finely divided dehydrated raw vegetables as just described, I proceed (in the manufacture of a powder wherewith to make creamed raw vegetable soup) to bring together and thoroughly mechanically mix the following ingredients, in substantially the following proportions, to-wit:

| Letter or number | |
|---|---|
| A | 5 to 10 lbs. milled dehydrated raw vegetables of the selected variety or varieties. |
| B | 15 to 25 lbs. vegetable protein, preferably derived from soya beans of the varieties Dunlap, Mandarin or Manchus. (Animal protein may be substituted for the vegetable protein, but is not so desirable, because neither so cheap nor stable and not so easily assimilated by the human digestive apparatus.) |
| C | 4 to 8 lbs. mono-sodium glutamate. |
| 1 | 10 to 15 lbs sodium chloride. (This salt is preferably free from insolubles and also preferably carries in and with it the very small but potent quantity of sodium nitrite next mentioned.) |
| D | ¼₀ to ⅒ lb. sodium nitrite. |
| 2 | 1 to 2 lbs. bicarbonate of soda. |
| 3 | 20 to 30 lbs. commercial milk powder (made from either whole or skimmed milk). |
| 4 | 3 to 7 lbs. sugar (preferably granulated sucrose). |
| 5 | 20 to 25 lbs. white wheat-flour (or corn starch equal to the normal starch content of the stated amount of flour.) |
| 6 | 1 to 2 lbs. suitable condiments (such as black and/or white pepper and/or marjoram and/or thyme, etc.). |

After being thoroughly mixed, these ingredients are preferably simultaneously milled to the finest attainable degree of fineness. While this procedure is preferred, I realize that the several ingredients, or any sub-group of same, may be separately milled and be brought into final relationship, merely by a thorough mechanical mixing operation.

All of the ingredients above listed are not necessarily present in a soup powder embodying and affording the advantages of my invention. Thus, for example, from a powder to be used in preparing a plain raw vegetable soup I may eliminate (either wholly or in part) all or any of the above listed ingredients which are designated as Nos. 2, 3 and 5. And, similarly, from a powder which is to be used in preparing either a plain soup or a creamed soup, I may eliminate (either wholly or in part) all or any of the ingredients designated as Nos. 1, 4 and 6 (leaving the introduction of all or any of these ingredients to the preference of the ultimate consumer).

The ingredients lettered A, B, C, and D, however, are the salient and indispensable ingredients which, in combination, give my raw vegetable soup powders their novel, distinguishing and desirable characteristics to which reference is made in this specification.

It is preferred, however, that all of the ingredients Nos. 1, 4 and 6 be included in any soup powder embodying my invention, and that ingredients Nos. 2, 3 and 5 be included in any creamed soup powder embodying my invention.

Common salt, as is well known, is naturally and unavoidably hygroscopic to an extent such that rancidity of the raw vegetables and protein would result upon exposure to air, due to the presence of common salt in my soup powders, were it not for the mono-sodium glutamate. The latter effectively counteracts any tendency of the finely divided raw vegetables and protein to become rancid in the presence of any atmospheric moisture which may be picked up by the salt.

To make a nourishing, healthful and palatable soup, a cup of cold water is slowly added and stirred into each two teaspoonfuls (approximately) of any selected one of the soup powders of the present invention. The mixture of soup powder and water is then slowly brought to a simmering temperature, to place the several constituents of the soup powder in suspension, and to effect a substantially instantaneous cure of the raw vegetables and protein by the sodium nitrite. The soup is now ready to serve, or to be retained on a steam table until ordered by a customer.

The term "dehydrated raw vegetables" as used in the appended claims, is to be interpreted to include dehydrated raw vegetables of but one variety, as well as dehydrated raw vegetables of a plurality of varieties.

Having thus described my invention, what I claim as new and desire to secure by United States Letters Patent, is:

1. The method of making a soup which consists in effecting a finely divided intimate mixture of a major quantity by weight of uncured vegetable protein with lesser quantities of uncured dehydrated raw vegetables and monosodium glutamate, and a least quantity of sodium nitrite, and finally heating a portion of said powder by and in water to suspend the finely divided constituents of the powder in the water and to effect a substantially instantaneous cure of the raw vegetables and protein by the sodium nitrite.

2. A dry powder wherewith to make soups and the like, said powder containing, thoroughly intermixed, uncured finely divided dehydrated raw vegetables and vegetable protein, and sufficient sodium nitrite to effect a substantially instantaneous cure of the vegetables and protein when and only when the constituents of the powder approach the simmering temperature of water added thereto.

3. A dry powder wherewith to make soups and the like, said powder containing, thoroughly intermixed, uncured finely divided dehydrated raw vegetables and protein, sufficient sodium nitrite to effect a substantially instantaneous cure of the vegetables and protein when and only when the constituents of the powder approach the simmering temperature of water added thereto, and sufficient mono-sodium glutamate to preserve the vegetables and protein and shield them from rancidity until cured by the sodium nitrite as aforesaid.

4. A dry powder wherewith to make soups and the like comprising, thoroughly intermixed, finely divided dehydrated raw vegetables, sufficient sodium nitrite to effect a substantially instantaneous cure of the vegetables when the constituents of the powder are heated to the simmering temperature of water added thereto, and sufficient mono-sodium glutamate to preserve the vegetables and shield them from rancidity until cured by the sodium nitrite as aforesaid.

HUGH E. ALLEN.